United States Patent Office 3,645,996
Patented Feb. 29, 1972

3,645,996
RESINS USEFUL IN PEPTIDE SYNTHESIS
George Lee Southard, Indianapolis, Ind., assignor to
Eli Lilly and Company, Indianapolis, Ind.
No Drawing. Filed Mar. 10, 1969, Ser. No. 805,884
Int. Cl. C08f 15/00, 15/04
U.S. Cl. 260—88.2 C       1 Claim

ABSTRACT OF THE DISCLOSURE

A benzyl styrene-divinylbenzene copolymer useful as an ester-forming C-protecting group in solid-phase peptide synthesis; used in conjunction with easily hydrolyzed N-protecting groups, preferably the enamine derivative prepared from β-dicarbonyl compounds; the benzyl styrene-divinylbenzene copolymer being readily removable, after peptide formation, with dilute acids in non-aqueous solvents at room temperature.

BACKGROUND OF THE INVENTION

Since peptides are important biological substances, and their isolation from biological systems in a pure state is difficult, it is necessary to prepare these materials by synthetic chemical methods. These methods involve as a fundamental step the coupling of two or more amino acids in a manner to form an amido linkage between the molecules:

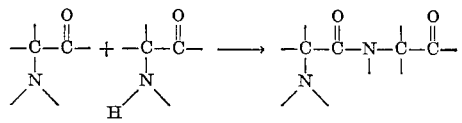

Since amino acids are at least bifunctional, it is also necessary for the chemist, prior to the coupling process, to render inactive all functionalities in a given amino acid which are not directly used in the coupling process. If reactive functionalities are allowed to remain, yields will be lower and purifications made difficult because of the presence of large amounts of unwanted by-products from the interaction of these functionalities. Several methods are well known to the chemist for rendering inactive the functionalities of simple amino acids with protecting groups in such a manner that only the desired functional group is available to react when the amido linkage is formed. It is necessary for the so-called "protecting group" to be readily attached to the amino acid before amide formation and to be readily removed from the resulting peptide, after coupling, without simultaneous rupture of the newly-formed amide linkage. Two types of protecting groups are necessary in peptide synthesis; the C-terminal protecting groups, those groups which render the acid portion of the amino acid inactive, as for example, alcohol derivatives, wherein the carboxylic acid function is inactivated by conversion into an ester; amine derivatives, wherein the carboxylic acid function is inactivated by conversion into an amide; and the like; and the N-terminal protecting groups, those groups which render the amine portion unreactive, such as benzyloxycarbonyl, trityl, allyloxycarbonyl and the like. It is with the C-terminal or carboxylic acid protecting group that this invention is predominantly concerned.

Merrifield, J. Am. Chem. Soc., 85, 2149 (1963), has disclosed a method of "solid state" peptide synthesis wherein an amino acid which eventually will form the C-terminal amino acid of the completed peptide is reacted with a chloromethyl moiety attached to a styrene-divinylbenzene copolymer in the form of a solid resin. This reaction binds the C-terminal amino acid at the carboxylic acid function as an inactive ester, and the amine function then is free to form a peptide linkage. Esterification is effected by reaction of the triethylammonium salt of the amino acid with the benzyl halide resin in an unreactive solvent at or above ambient room temperature. The resulting amino ester-resin is then reacted in a two-phase (solid-liquid) system with a solution of the N-protected amino acid which will eventually form the second fragment of the peptide molecule. This amide-forming reaction is caused to occur by activating the carboxylic acid function of the adding amino acid, as for example by the use of dicyclohexylcarbodiimide, by conversion to the acid halide, acid anhydride, or mixed anhydride, or like methods well-known to those skilled in the art. After washing off the excess reactants from the solid resin, the N-terminal protecting group is removed, and the resin, now containing a dipeptide, is subsequently reacted with a different N-protected amino acid to prepare a tripeptide. Repetition of the N-protecting group removal and amidification steps is utilized to build up long-chain peptides in a manner well-described by the prior art. As a final step, the completed peptide is removed from the resin by contacting the peptide-resin with hydrogen bromide in glacial acetic acid.

SUMMARY

This invention relates to a novel group of resinous materials useful as C-protecting groups in peptide synthesis which by virtue of their structural characteristics are more easily removed from a completed peptide sequence than are prior-art resinous C-protecting groups. The resinous materials of this invention can readily be removed by contacting the resin-peptide with a solution of a dilute acid in a non-aqueous solvent at room temperature for a time as short as five minutes. The resinous materials of this invention also possess certain other unusual and beneficial properties when used in solid-phase peptide synthesis as will become obvious to those skilled in the art from a further reading of this description.

In a second embodiment this invention relates to a method for using the above resinous material. The method of this invention is useful for the manufacture of glucagon, a naturally occurring hyperglycemic agent, and other similar peptides.

DETAILED DESCRIPTION

The novel resinous material of this invention can be characterized by the formula:

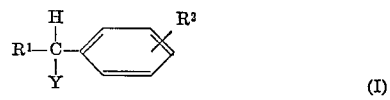

(I)

wherein $R^1$ is a resinous styrene-divinylbenzene copolymer attached at a point on a phenyl ring contained therein; and $R^2$ is hydrogen or a non-reactive substituent, which by virtue of its electronic influence on the α-carbon atom, varies the ease of removability of the peptide from the resin; and Y is hydroxyl, chloro, or bromo.

Amino acids useful for making peptides can be esterified by the α-substituted benzyl polymer of Formula I (hereinafter referred to as "the resin"). Such amino acids are typically represented by the formula

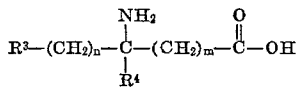

wherein $R^3$ is hydrogen, lower alkyl, hydroxy-substituted lower alkyl, carboalkoxyamino-substituted lower alkyl, carboxy-substituted lower alkyl, lower-alkylmercapto-substituted lower alkyl, guanidino-substituted lower alkyl, guanidinooxy-substituted lower alkyl, imidazolylmethyl, indolylmethyl, or phenyl; $R^4$ is hydrogen or lower alkyl; and $m$ and $n$ are zero or one.

The esterification is carried out with the amino acid in the form of an N-protected derivative, which derivative is hereinafter defined. The N-protecting group can then be removed and the resulting amino-ester resin becomes the C-terminal amino acid of a peptide chain which can be reacted sequentially with the same or differing amino acids in a stepwise manner to build a desired peptide chain.

Following the formation of the desired peptide chain, the resinous C-protecting group is removed by treatment with a mineral acid or Lewis type acid is an essentially non-aqueous solvent to remove the resin protecting group and free the peptide.

Thus, in a second embodiment, this invention relates to a method for preparing peptides wherein the α-substituted benzyl copolymer is used as a C-protecting group, certain novel N-protected amino acids are coupled thereto in a sequential manner to form a peptide, and the completed peptide is removed therefrom.

Esterification of an appropriately substituted N-protected amino acid can be accomplished from either the α-hydroxy or α-halobenzyl polymer by the usual methods of ester formation well-known to those skilled in the art. It is preferred for the present invention to use the α-halobenzyl polymer since esterification can be accomplished by refluxing a mixture of the protected amino acid and the resin in neutral non-aqueous solvents, thereby avoiding unwanted side reactions common in basic or acidic solution.

Amino acids which can be joined or coupled to existing fragments of a C-protected peptide chain on the resin by the method of this invention include compounds also typically represented by the above formula, i.e.,

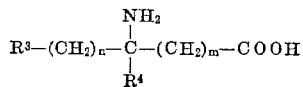

wherein $R^3$, $R^4$, $m$, and $n$ are the same or different groups as hereinbefore defined.

The coupling process can be carried out by methods well defined in the prior art and hereinbefore described, as for example by the use of dicyclohexylcarbodiimide, by conversion of the entering acid to the acid halide, acid anhydride or mixed anhydride, or the like method.

Accordingly, the method embodiment of this invention can be defined in terms of the following structural representation.

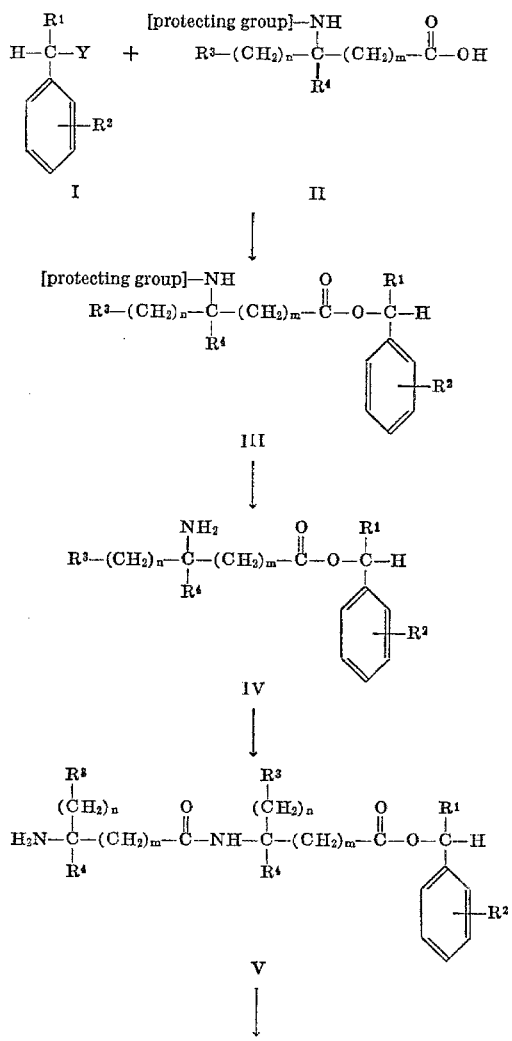

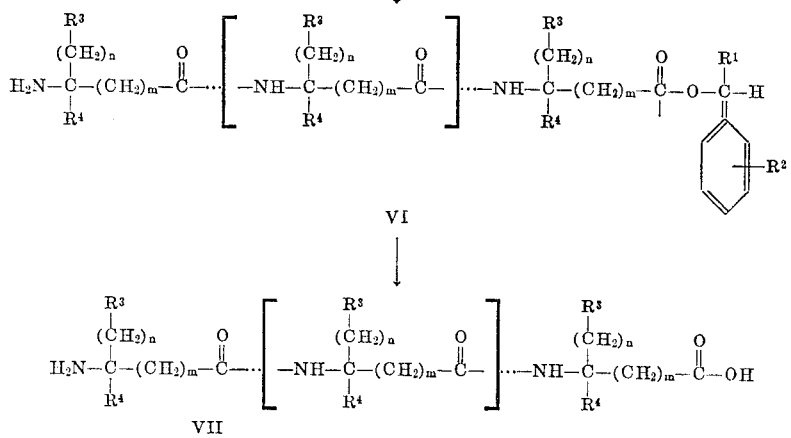

VI

VII

Variation in R² can best be defined by reference to the well-known Hammett's substituent constant "σ" which, for purposes of this invention should fall within the range between about −0.3 and about +1.2.

Examples of substituents falling within this range and their accepted σ constants are as follows.

Substituents: σ
- p-CH₃O _____ −0.268
- p-C₂H₅O _____ −0.25
- 3,4-di-CH₃ _____ −0.229
- m-(CH₃)₂N _____ −0.211
- p-(CH₃)₂N _____ −0.205
- p-tert.-C₄H₉ _____ −0.197
- p-CH₃ _____ −0.170
- 3,4-CH₂O₂ _____ −0.159
- p-C₂H₅ _____ −0.151
- p-iso-C₃H₇ _____ −0.151
- m-CH₃ _____ −0.069
- p-CH₃S _____ −0.047
- H _____ 0.000
- p-C₆H₅ _____ +0.009
- p-F _____ +0.062
- m-CH₃O _____ +0.115
- m-C₂H₅O _____ +0.15
- m-C₆H₅ _____ +0.218
- p-Cl _____ +0.227
- p-Br _____ +0.232
- p-I _____ +0.276
- m-CH₃CO _____ +0.306
- m-F _____ +0.337
- m-I _____ +0.352
- m-Cl _____ +0.373
- m-Br _____ +0.391
- m-NO₂ _____ +0.710

Hammett, "Physical Organic Chemistry" McGraw-Hill Book Co., N.Y., first edition, 1940, p. 188.

Resins containing a substituent having a σ constant of about zero or less are preferred since their esters are more easily cleaved.

The ease of the cleavage of the ester-resin bond is governed not only by the electronic influence of the substituent in the benzyl group, but also by the acid used in cleaving the ester bond. Although any strong acid can be used, it is preferable to use the most dilute concentration of the weakest anhydrous acid that will be operative in a non-hydroxylic solvent to minimize unwanted side reaction.

Variations in the ester cleavage rates and yields caused by modification of cleaving acids, reaction conditions, and substitution on the benzyl portion of the resin are shown by the following values which have been determined for the cleavage of glycine and alanine at ambient room temperature and under anhydrous conditions from the appropriately substituted resin by the following reaction

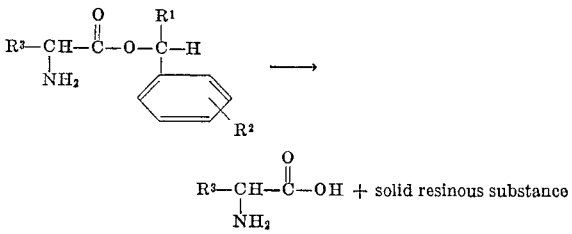

CLEAVAGE CONDITIONS OF AMINO ACID BENZHYDRYL ESTERS

| R² | R³ | Cleavage reagent | Time, minutes | Percent cleavage |
|---|---|---|---|---|
| H | CH₃ | TFA-CHCl₃(50:50 v./v.) | 30 | 100 |
| H | CH₃ | TFA-CHCl₃(5:95 v./v.) | 30 | 100 |
| H | CH₃ | TFA-CHCl₃(5:95 v./v.) | 5 | 100 |
| H | CH₃ | TFA-CHCl₃(1:99 v./v.) | 30 | 39 |
| Cl | CH₃ | TFA-CHCl₃(50:50 v./v.) | 30 | 100 |
| H | H | 1.1 N BF₃:Et₂O in HOAc | 60 | 74 |
| H | H | 0.2 N BF₃:Et₂O in CHCl₃ | 3 | 91 |
| H | CH₃ | 0.2 N BF₃:Et₂O in CHCl₃ | 5 | 88 |
| H | CH₃ | 0.03 N BF₃:Et₂O in HOAc and CHCl₃ | 5 | 94 |
| Cl | CH₃ | 0.2 N BF₃:Et₂O in CHCl₃ | 5 | 64 |
| Cl | CH₃ | 1 N HCl in HOAc in CHCl₃ | 90 | 85 |
| Cl | CH₃ | 1 N HCl in HOAc | 30 | 14 |
| Cl | CH₃ | 1 N HCl in HOAc | 90 | 42 |
| H | CH₃ | 1.4 N HCl in THF | 30 | 24 |
| H | CH₃ | 0.16 N HCl-THF in CHCl₃ | 5 | 14 |
| H | CH₃ | 0.42 N HCl-THF in CHCl₃ | 5 | 29 |
| OCH₃ | CH₃ | 0.42 N HCl in dioxane | 5 | 12 |
| H | CH₃ | ...do... | 5 | 0 |

Note.—TFA=trifluoroacetic acid; HOAc=acetic acid; THF=tetrahydrofuran.

Examples of α-amino acids, wherein m=zero in the above formula, employed after esterification or amidification to form peptides on the novel resin of this invention include the following variations on the R³ substituent in their structural formulas.

| R³: | Common name |
|---|---|
| H | Glycine. |
| Alkyl | Alanine. |
| | Valine. |
| | α-Amino-n-butyric acid. |
| | Iso-leucine. |
| | Tert.-leucine. |
| Hydroxy-substituted lower alkyl. | Serine. |
| | Threonine. |
| | Hydroxyvaline. |
| Carboxy-substituted lower alkyl. | Aspartic acid. |
| | Glutamic acid. |
| Carboalkoxyamino-substituted lower alkyl. | ε-Benzyloxycarbonyllysine. |
| | δ-tert.-Butyloxycarbonylornithine. |
| | ε-Amyloxycarbonyllysine. |

| $R^3$: | Common name |
|---|---|
| Lower-alkyl-mercapto-substituted lower alkyl. | Methionine. Ethionine. S-ethylcysterine. S-methylhomocysteine. |
| Guanidino-substituted lower alkyl. | Arginine. |
| Guanidinooxy-substituted lower alkyl. | Canavanine. |
| Imidazolylmethyl | Histidine. |
| Indolylmethyl | 1-methylhistidine. |
| Phenyl | Tryptophan. Phenylglycine. Phenylalanine. |
| Piperdine | Pipecolic acid. |
| Pyrrolidine | Proline. |

The amino acids resulting when $m$ is 1 and $n$ is 0 or 1 in the above formula, commonly called β-aminoacids, also react in an analogous manner to the α-amino acids halogenated acids or by the addition of ammonia to α,β-unsaturated acids.

Examples of such β-amino acids can include:

α-phenyl-β-aminopropionic acid
β-phenyl-β-aminopropionic acid
β-aminopropionic acid
β-aminobutyric acid
β-aminocaproic acid
ω-hydroxy-β-aminovaleric acid
ε-hydroxy-β-aminocaproic acid
β-aminoisovaleric acid
β-amino-γ-guanidinovaleric acid
β-aminoglutaric acid
β-amino-γ-methylmercaptobutyric acid
β-amino-γ-ethylmercaptobutyric acid
γ-4-imidazolyl-β-aminobutyric acid and the like.

The necessity for hydrolysis of the resin-ester function after peptide formation, hereinbefore described as dependent upon ring substitution as defined by the term "$R^2$" in the benzyl portion of the resin, places certain limitations upon the N-protecting groups available for use in this invention. It has been found that the relatively labile groups, as for example o-nitrophenylsulfenyl, 2-(2-phenylpropyl-), and enamine, are the preferred N-protecting groups.

The o-nitrophenylsulfenyl and 2-(2-phenylpropyl)-groups are well-known to the art as N-protecting groups, as are the alkali metal salts of the enamines. However, the alkali-metal salts of the enamines are completely unreactive in the process of this invention. It has been found, however, that the di-lower alkylamine, dibenzylamine, and di-$C_5$-$C_7$ cycloalkylamine salts of the enamines are quite reactive toward the amino ester-resin and are much to be preferred as entering acids in solid-state peptide synthesis.

Typical of the amines useful for preparing soluble enamino acid salts are diethylamine, diisopropylamine, di-tert.-butylamine, isopropyl-tert.-butylamine, dicyclopentylamine, dicyclohexylamine, dicycloheptylamine, dibenzylamine, and the like.

Thus, in the second embodiment of this invention, enamino acids in the form of their di-lower alkylamine, dibenzylamine, or di-$C_5$-$C_7$ cycloalkylamine salts can be used as the amide- and ester-forming entering groups to prepare the desired peptide sequence, i.e. when [protecting group] is enamine, $R^8$ is di-lower-alkylamino, dibenzylamino, or di-$C_5$-$C_7$ cycloalkylamino.

The enamine N-protecting group can be represented by the formula

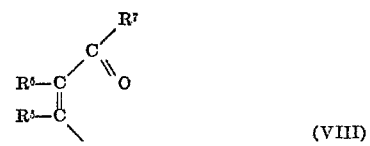

and the enamino acids prepared therefrom can be represented by the formulas

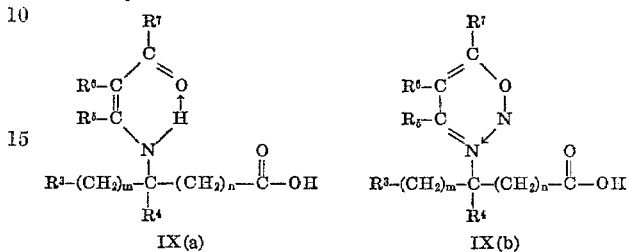

wherein:

$R^3$, $R^4$, $m$, and $n$ are as hereinabove defined;
$R^5$, taken alone, is hydrogen, lower alkyl, or phenyl;
$R^6$, taken alone, is hydrogen, lower alkyl, phenyl-substituted lower alkyl, or phenyl;
$R^7$, taken alone, is hydrogen, lower alkyl, lower alkoxy or phenyl;
$R^6$ and $R^7$, when taken together with the carbon atoms to which they are attached, complete a carbocyclic ring having the structure of benzene or naphthalene; and
$R^5$ and $R^7$, when taken together with the interconnecting carbon atoms, complete a $C_5$-$C_7$ cycloaliphatic ring.

"Lower alkyl" as used in this specification includes methyl, ethyl, n-propyl, isopropyl, n-butyl, isobutyl sec.-butyl, and tert.-butyl.

"$C_5$-$C_7$ cycloalkyl" can include cyclopentyl, cyclohexyl, and cycloheptyl.

"Hydroxy-substituted lower alkyl" can include hydroxymethyl, α-hydroxyethyl, β-hydroxyethyl, γ-hydroxypropyl, 2-hydroxy-2-propyl, 2-hydroxy-2-butyl, 2-hydroxy-3-butyl, hydroxy-tert.-butyl, and the like.

"Carboalkoxyamino-substituted lower alkyl" can include benzyloxycarbonylaminomethyl, tert.-butyloxycarbonylaminoethyl, benzyloxycarbonylaminopropyl, and the like.

"Carboxy-substituted lower alkyl" can include carboxymethyl, carboxyethyl, 2-carboxy-2-propyl, 2-carboxymethyl-2-propyl, and the like.

"Lower-alkylmercapto-substituted lower alkyl" can include methylmercaptoethyl, isopropylmercaptomethyl, n-propylmercaptoethyl, methylmercaptobutyl, 2-methylmercapto-2-propyl, 3-methylmercapto-2-butyl, 2-methylmercaptomethyl-2-propyl, and the like.

"Guanidino-substituted lower alkyl" can include guanidinomethyl, guanidinoethyl, 2-guanidino-2-propyl, α,α-dimethylguanidinoethyl, and the like.

"Guanidinooxy-substituted lower alkyl" refers to the above guanidino-substituted lower alkyl substituent wherein the heterocyclic guanidine group is attached to the lower alkyl group through an additional oxygen atom.

"Phenyl-substituted lower alkyl" refers to the lower alkyl groups defined hereinbefore in which any hydrogen atom has been replaced by a phenyl group as for example benzyl, α-phenylethyl, β-phenylethyl, 2-phenyl-2-propyl, and the like.

Formulas II(a) and II(b), above, demonstrate two different electronic representations of the hybrid enamine system as defined for the structure by Dane et al., Angew. Chem., 74, 873 (1962). It is well-known that structural formulas cannot represent the true picture of the resonant hybrid. The presence of resonance stabilization through some other portion of the molecule will, of course, allow the structure to be represented more precisely by one of the formulas, although the molecule will exist at all times in a hybrid form represented in part by the other structural formula. It will be seen that when $R^6$ and $R^7$ form a ring with resonance stabilization, structure II(b) will more nearly represent the predominating species. When $R^6$ and $R^7$ do not form such a ring, it is believed that the structure of the compound is more nearly represented by II(a). For example, when $R^6$, taken together with $R^7$ and the carbon atoms to which they are respectively attached, form benzene, the preferred structural representation would be:

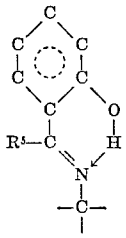

whereas when $R^6$ and $R^7$ are each methyl, the preferred species is thought to be represented more correctly by:

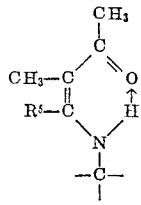

It should be understood, however, that the true species cannot be accurately represented by a single structure, but only by a hybrid of the written structures. For the sake of simplicity, the formula of the compound defined by either II(a) or II(b), or a hybrid structure thereof, will be written as the structure obtained from a noncyclic di-ketone II(a), although it is to be understood this is not a limiting notation.

The C-protected amino acids are conveniently prepared by condensing an appropriately substituted amino acid, as the salt thereof, with a β-diketone, β-ketoester, or other β-dioxocompound, one method of effecting such a condensation being a modification of that described by Dane et al., supra. Either optical isomer of the amino acid, or the racemic mixture, can be employed.

Examples of β-dicarbonyl compounds which can be used to condense with the amine function of the amino acid include acetylacetone, propionylacetone, butyrylacetone, isobutyrylacetone, 3,5-diketo - 2,6 - dimethylheptane, acetylacetophenone, benzoylbenzophenone, 3-methyl-2,4-diketopentane, 3-phenyl - 2,4 - diketopentane, α-acetylpropiophenone, α-benzoylpropiophenone, 3-(β-phenethyl)-2,4-diketopentane, salicylaldehyde, 2-hydroxy - 1 - naphthaldehyde, 2 - hydroxyacetophenone, 2 - hydroxypropiophenone, and the like.

The compounds wherein $R^5$ and $R^7$, taken together with the interconnecting carbon atoms, complete a $C^5$–$C^7$ cycloaliphatic ring are prepared from such cyclic structures as 1,3-cyclopentanedione, 1,3-cyclohexanedione, 5,5-dimethyl-1,3-cyclohexanedione, 1,3-cycloheptanedione, and the like.

Used in conjunction with the resin of this invention, the enamines defined above can be hydrolyzed by very weak acids or bases, as for example, aqueous carbonic acid or saturated sodium bicarbonate solution, to give a free amino group. Obviously stronger acids and bases can be used, as for example aqueous hydrochloric acid or the like. The weak acids and bases are preferred so as to reduce the possibility of undesired side reactions occurring during hydrolysis. These hydrolyses are carried out at between ambient room temperature and the freezing point of the reaction solution.

The preparation of the enamino acid-dicyclohexylamine salt useful for the method embodiment of this invention is illustrated by the following general method.

A mixture of 47.8 mM. of amino acid, 20 ml. of methanol, 5–30 ml. water and 9.44 ml. dicyclohexylamine is warmed on the steam bath until solution is complete. To the mixture is added a solution of 7.8 g. (48 mM.) benzoylacetone in 20 ml. of ethanol, which is warmed under reflux to effect solution. The condenser is then removed, and the solution evaporated to a small volume either on the steam bath or in vacuo. Isopropanol is added several times in 50 ml. proportions, and after each addition the solution evaporated to dryness in vacuo to azeotropically remove a residual amount of water. Purification is effected by dissolving the product in a minimum amount of methylene chloride, removing the small amount of unreacted amino acid by filtration, and precipitating the product from the filtrate by the addition of ether. The product is filtered, washed with ether, and air dried.

The following table describes various N-(1-benzoylisopropenyl)amino acid-dicyclohexylamine salts prepared by the above method.

In order to determine the optical and structural stability of the enamino acid-dicyclohexylamine salts, several salts were hydrolyzed after shelf-storage up to two years. The enamino acid-dicyclohexylamine salt (5 mM.) was mixed with 50 ml. of 60% (v./v.) aqueous ethanol and 10 ml. of 1 N aqueous hydrochloric acid. The mixture was allowed to stand a few minutes at room temperature then warmed in the stem bath for 10 minutes with occasional shaking. The ethanol was removed in vacuo, and the water removed by azeotropic distillation

| Amino acid | Percent field | $[S]k^{25}$ | Theory C | H | N | Found C | H | N | M.P., °C. |
|---|---|---|---|---|---|---|---|---|---|
| L-alanine | 60 | +170.2 a (C,1 EtOH) | 72.42 | 9.23 | 6.75 | 72.19 | 9.30 | 6.73 | 163–164 |
| β-Benzyl-L-aspartate | 84 | +16.68 (C,2 EtOH) | 72.24 | 8.08 | 5.10 | 72.33 | 8.35 | 5.38 | 111–115 |
| N4-xanthyl-L-asparagine | 83 | −79.79 (C,2 EtOH) | 73.44 | 7.43 | 6.59 | 73.32 | 7.38 | 6.72 | 181–183 |
| S-benzhydryl-L-cysteine | 59 | −138.7 (C,1 EtOH) | 74.47 | 7.89 | 4.57 | 74.67 | 8.07 | 4.84 | 135–137 |
| S-trityl-L-cysteine | 66 | −151.0 (C,1 EtOH) | 76.70 | 7.60 | 4.06 | 76.67 | 7.49 | 4.09 | 186–188 |
| N5-xanthyl-L-glutamine | 58 | +8.17 (C,1 EtOH) | 73.70 | 7.58 | 6.45 | 73.82 | 7.70 | 6.54 | 198–22 |
| Glycine | 88 |  | 71.96 | 9.05 | 6.99 | 71.76 | 9.17 | 7.22 | 172.5–173 |
| L-isoleucine | 48 | +145.1 (C,1 EtOH) | 73.64 | 9.71 | 6.13 | 73.39 | 9.81 | 6.18 | 149–151 |
| L-leucine | 60 | +118 (C,2 MeOH a) | 73.64 | 9.71 | 6.13 | 73.78 | 9.58 | 6.03 | 117–119 |
| Nε-benzyloxycarbonyl-L-lysine | 57 | +149.6 (C,2,CH2Cl2) | 71.25 | 8.63 | 6.92 | 71.21 | 8.50 | 7.13 |  |
| O-tert.-butyl-L-serine | 89 | −1.139 (C,1 EtOH) | 71.56 | 9.52 | 5.75 | 71.60 | 9.29 | 5.75 | 165–166 |
| O-tert.-butyl-L-threonine | 58 | 10.7 (C,2 EtOH) | 71.96 | 9.66 | 5.60 | 71.96 | 9.50 | 5.60 | 174–177 |
| L-methionine | 87 | +20.64 (C,2 EtOH) | 68.31 | 8.91 | 5.90 | 68.47 | 8.91 | 5.68 | 168–170 |
| O-tert.-butyl-L-tyrosine | 52 | −3.39 (C,2 EtOH) | 73.56 | 9.35 | 5.19 | 73.45 | 9.15 | 5.09 | 156–159 |
| L-phenylalanine | 51 | −276.8 (C,1 EtOH) | 76.09 | 8.62 | 5.71 | 76.03 | 8.55 | 5.61 | 152–154 |
| L-valine | 90 | +189.1 (C,1 EtOH) | 73.59 | 9.15 | 6.35 | 73.39 | 9.41 | 6.10 | 161–162 |
| L-proline | 76 | +94.10 (C,1 EtOH) | 73.76 | 8.94 | 6.83 | 73.51 | 8.91 | 6.79 | 186–187 |
| L-serine | 79.3 | +98.88 (C,2 MeOH) | 70.06 | 8.47 | 6.54 | 69.80 | 8.36 | 6.26 | 192–193 |
| L-arginine b | 85 |  | 60.36 | 6.96 | 17.59 | 60.22 | 7.02 | 17.35 | 265–266 |
| L-threonine | 82 | +114.18 (C,2 MeOH) | 70.23 | 9.07 | 6.30 | 70.00 | 8.93 | 6.15 | 203–204 |
| L-asparagine | 73 |  | 68.24 | 8.59 | 9.18 | 68.00 | 8.37 | 8.97 | 166–167 |
| γ-Benzyl-L-glutamate | 43 |  | 72.56 | 8.23 | 4.97 | 70.35 | 8.46 | 5.43 | 141–143 |
| L-histidine b | 53 |  | 64.20 | 5.74 | 14.05 | 64.98 | 5.47 | 13.74 | 225–226 |
| L-glutamine | 69 | +48.05 (C,2 EtOH) | 68.47 | 9.15 | 8.87 | 68.25 | 8.93 | 8.71 | 163–165 | a MeOH=methanol; EtOH=ethanol.
b Internal zwitterion salt. Due to the basic character of arginine and histidine, dicyclohexylamine was not used in the preparation of their 1-benzoylisopropenyl derivatives and is not a constituent of the described product.

with benzene. Trituration of the residue gave a white solid which was suspended in 25 ml. ethanol and 10 mM. of triethylamine was added. The mixture was allowed to stand 5 to 10 minutes at room temperature with occasional swirling, the ethanol was removed in vacuo, and the residue collected and washed sequentially with ether, chloroform, ethanol (a minimum amount of water if the amino acid was insoluble in water), and acetone, then dried in vacuo over phosporous pentoxide. The amino acid thus obtained was compared with the amino acid utilized in preparing the enamine by observation of its optical rotation, melting point, and thin layer chromatographic behaviour in an isopropanol, acetic acid, water, piperidine (30:6:24:20) system.

OPTICAL PURITY OF AMINOACIDS DERIVED FROM HYDROLYZED ENAMINE - DICYCLOHEXYLAMMONIUM SALTS

| Amino acid | $[\alpha]_D^{25}$ Pre-enamine | Post enamine | Percent recovery |
|---|---|---|---|
| S-benzhydryl-L-cysteine. | +18.50 (C,2.9, 0.1 N HCl)[a] | +18.77 | 73 |
| L-valine | +27.70 (C,2.4, 6 N aq. HCl) | +26.35 | 74 |
| L-serine | +11.45 (C,9.3, 1 N aq. HCl) | +10.86 | 80 |

[a] In a mixture of ethanol-water to effect solution.

The following examples are presented to describe the invention more clearly, but are not to be construed as exclusive embodiments thereof.

EXAMPLE I

Polystyrene-2% divinylbenzene copolymer (available as "Biobeads" from Bio-Rad Laboratories, Richmond, Calif.), 10 g., was slurried in 60 ml. of nitrobenzene and the mixture cooled to 0° C. Benzoyl chloride, 10 millimoles (mM.), and aluminum chloride, 10 mM., were added and the mixture was stirred at 0° C. for 30 minutes, then allowed to warm slowly to room temperature while being stirred 3 additional hours. The solid product, benzoyl polymer, was removed by filtration and washed with two successive 100-ml. portions of dioxane, 200-ml. of 3:1 dioxane-3 N aqueous hydrochloric acid, 100 ml. of dioxane, 200 ml. of methylene chloride, and 200 ml. of methanol, then dried in vacuo.

The benzoyl polymer (10 g.) thus prepared was dispersed in 60 ml. of diethylene glycol dimethyl ether ($CaH_2$-dried), cooled to 0° C., and reduced by the slow addition of 50 mM. of sodium borohydride suspended in 60 ml. diethylene glycol dimethyl ether. Stirring was continued for 30 minutes at 0° C. and for 16 hours at 40–50° C. The mixture was then cooled to 0° C. and the excess reducing agent destroyed by the slow addition of 6 N aqueous hydrochloric acid. The solid product, $\alpha$ - hydroxybenzyl - polymer was isolated by filtration and washed with 5 portions of 100 ml. each of hot water, hot ethanol, and hot methanol, then vacuum dried.

The $\alpha$-hydroxybenzyl polymer (10 g.) thus prepared was suspended in 100 ml. of methylene chloride and saturated with dry HCl for one hour. The product $\alpha$-chloro resin was removed by filtration, washed with methylene chloride, and vacuum dried.

EXAMPLE II

Polystyrene-2% divinylbenzene copolymer was acylated with p-chlorobenzoyl chloride in the same manner as Example I except that the total reaction time was reduced to 30 minutes at 0° C. and 105 minutes at 50–60° C. temperature to form the p-chlorobenzoyl polymer. The $\alpha$, p-dichlorobenzyl polymer was prepared in the same manner as Example I.

EXAMPLE III

Polystyrene-2% divinylbenzene copolymer was acylated with p-methoxybenzoyl chloride in the same manner as Example I except that the reaction mixture was stirred for 19 hours at room temperature prior to filtration to form p-methoxybenzoyl polymer. The $\alpha$-chloro-p-methoxybenzyl polymer was prepared in the same manner as Example I.

EXAMPLE IV

Esterification and deblocking step

To 10 g. (0.72 mM. Cl./g.) of $\alpha$-chlorobenzyl polymer ($\alpha$-chloro resin) were added 7.8 g. (17.6 mM.) of N-(1-benzoylisopropenyl) - L - valine dicyclohexylammonium salt in 125 ml. chloroform. The mixture was heated under reflux for 16 hours, filtered, and washed sequentially with 100 ml. portions of dimethylformamide, dioxane, chloroform, and methanol. Hydrolysis of the enamine was accomplished by shaking the $\alpha$-enamino ester resin with 150 ml. tetrahydrofuran, filtering, then shaking for 30 minutes with a solution of 10 ml. of 6 N aqueous hydrochloric acid and 140 ml. of 0.40 N aqueous tetrahydrofuran. The mixture was filtered and washed three times for five minutes each with 100-ml. portions of methylene chloride. Chloroform, 60 ml., and triethylamine, 3 ml., were added and the mixture was shaken for 10 minutes, filtered, and washed twice with 100-ml. portions of methylene chloride. Amino acid analysis of an acid hydrolysate showed 0.149 mM. of valine per gram of resin.

EXAMPLE V

To 10 g. (1.49 mM.) L-valyl resin were added 1.2 g. (3.0 mM.) of N-(1-benzoylisopropenyl)glycine dicyclohexylammonium salt, 0.516 g. (3.0 mM.) of anhydrous p-toluenesulfonic acid, 100 ml. of methylene chloride, and 0.618 g. (3.4 mM.) of dicyclohexylcarbodiimide. The mixture was shaken for 22 hours, filtered, and washed sequentially with two-100 ml. portions each of dimethylformamide, methylene chloride, methanol, and tetrahydrofuran. The enamine protecting group was removed by shaking the mixture with a solution of 10 ml. of 6 N aqueous hydrochloric acid and 140 ml. of 0.4 M aqueous tetrahydrofuran for 30 minutes.

The resulting dipeptide resin was filtered and washed sequentially with 100 ml. of tetrahydrofuran and two 100-ml. portions of chloroform. It was then shaken 10 minutes in a solution of 6 ml. of triethylamine in 100 ml. of chloroform, filtered, and washed with two 100-ml. portions of chloroform.

Amino acid analysis of an acid hydrolysate showed .054 mM. and .059 mM. of glycine and valine respectively per gram of resin. The ratio of valine to glycine was 1.09.

EXAMPLE VI AND VII

Alanine and leucine were introduced onto the peptide chain by way of their enamine-dicyclohexylamine salts by the method of Example V to give leu-ala-gly-val resin, which was isolated as the hydrochloride salt.

Amino acid analysis of an acid hydrolysate after the alanine cycle showed .059, .060, .060, mM. of alanine, glycine, and valine respectively per gram of resin. Amino acid ratios were ala, 1; gly, 1.02; val, 1.02. Amino acid analysis of an acid hydrolysate after the leucine cycle excluding the triethylamine treatment showed .055, .055, .054, and .061 millimoles of leucine, alanine, glycine, and valine respectively. Amino acid ratios were leu, 1.01; ala, 1.01; gly, 1.00; val, 1.13.

Cleavage of tetrapeptide from resin

Leu-ala-gly-valine ester-resin hydrochloride was shaken for 30 minutes in 60 ml. of 50% v./v. trifluoroacetic acid in chloroform at room temperature. The resin was removed by filtration, washed with an additional 50 ml. of fresh trifluoroacetic acid-chloroform mixture and 200 ml. of methylene chloride. The filtrates were combined and evaporated to dryness in vacuo at room temperature. The residue was triturated with ether until the product crystallized. The solid product, leu-ala-gly-valine hydrochloride, was removed by filtration. Amino-acid analysis: leu, 1.05; ala, 1.0; gly, 0.95; val, 1.05. Yield 139.3 mg. (76%).

EXAMPLE VIII

To 1.26 g. (5.2 mM.) of o-nitrophenylsulfenylalanine were added 0.84 g. (5.2 mM.) of N,N-diimidazolecarbonyl and 30 ml. of methylene chloride. The mixture was shaken for 15 minutes, then 2 g. (2.60 mM.) of α-hydroxy resin was added and the suspension shaken an additional 23 hours. The N-protected amino ester resin was filtered and washed sequentially with methylene chloride, ethanol, and methanol, and dried in vacuo for 3 hours at 45° C. To the resulting N-protected amino ester resin was added a 0.2 M dry hydrogen chloride in tetrahydrofuran solution and the mixture shaken for 10 minutes. The N-protected amino ester resin was still yellow in color; so the acid treatment and wash were repeated two more times and the filtrates were combined. The product was still yellow and still analyzed for the o-nitrophenylsulfenyl group. Triethylamine, 6 ml. in 50 ml. chloroform, was then added and the suspension shaken for 10 minutes. The amino ester resin was filtered and washed with three 50-ml. portions of chloroform. A solution of 0.45 g. (1.4 mM.) of N-benzyloxycarbonyl-L-phenylalanine in 30 ml. of methylene chloride was added, followed by 0.30 g. (1.4 mM.) of dicyclohexylcarbodiimide, and the mixture was shaken for 18 hours at ambient room temperature. The resin was filtered, washed sequentially with dimethylformamide, ethanol, and methanol, and dried in vacuo at 50° for 3 hours. An amino-acid analysis of an acid hydrolysate showed 0.342 mM. and 0.348 mM. of alanine and phenylalanine respectively per gram of resin. The ratio of phenylalanine to alanine was 1.02. A dried sample of the dipeptide resin, 1.76 g. (0.612 mM. of dipeptide), was shaken with 35 ml. of chloroform and treated with 7 ml. acetic acid and 1.05 ml. of boron trifluoride-etherate. After being shaken for five minutes the resin was filtered and washed with three 15-ml. portions of acetic acid, with ethanol, and with methanol, and dried in vacuo at 40° for 2 hours. Analysis of the resin showed 0.02 mM. each of alanine and phenylalanine per gram of resin, indicating a 94% cleavage. The acid filtrate and washes were combined and lyophilized. The residue was dissolved in ether-water. The water layer was separated and discarded and the organic layer was dried and evaporated in vacuo. The residue was dissolved in ethyl acetate, precipitated with petroleum ether, collected, and dried in vacuo to give 0.18 g., 82%, of a material showing an amino acid ratio of phe, 1.00; ala, 1.17.

I claim:
1. A compound of the formula

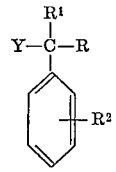

wherein
$R^1$ is a solid resinous styrene-divinylbenzene copolymer;
$R^2$ is a hydrogen or a substituent characterized by having a Hammett's substituent constant "σ" from about −0.3 to about +1.2; and
Y is hydroxyl, chloro, or bromo.

References Cited
UNITED STATES PATENTS
3,316,223    4/1967    Baer et al. _____ 260—80.5

JOSEPH L. SCHOFER, Primary Examiner

R. A. GAITHER, Assistant Examiner

U.S. Cl. X.R.

260—87.5 R, 87.5 C, 88.1 P, 112.5, 309, 326.14, 468, 470, 471, 481, 482, 501.11, 501.12

PO-1050
(5/69)

UNITED STATES PATENT OFFICE
CERTIFICATE OF CORRECTION

Patent No. 3,645,996          Dated February 29, 1972

Inventor(s) George Lee Southard

It is certified that error appears in the above-identified patent and that said Letters Patent are hereby corrected as shown below:

In column 3, line 25, "acid is an" should read --acid in an--.

In columns 5 and 6 at the right-hand end of structure VI, the exo double bond from the benzene ring should be a single bond.

In column 7, line 4, "S-ethylcysterine" should read --S-ethylcysteine--.

In column 7, lines 11 through 15 should read as follows:

Imidazolylmethyl------------------Histidine.
                                                1-methylhistidine.
     Indolylmethyl---------------------Tryptophan.
     Phenyl----------------------------Phenylglycine.
                                                Phenylalanine.

In column 7, lines 22 and 23, "acids halogenated" should read --acids and are prepared by amination of the appropriate β-halogenated--.

In column 8, line 14 of structure IX(b), "R5" should read --$R^5$--

In column 10, line 6, "$C^5-C^7$" should read --$C_5-C_7$--.

In column 10, line 74, "stem" should read --steam--.

In columns 9 and 10, column 3 of the table, the heading "$[S]k^2$" should read --$[\alpha]_D^{25}$--.

In columns 9 and 10, column 3 of the table, line 1, "+170.2$^a$(C,1 EtOH)" should read --+170.2 (C,1 EtOH$^a$)--.

In columns 9 and 10, column 9 of the table, line 11, "5.75", second occurrence, should read -- 5.57 --.

PO-1050
(5/69)

UNITED STATES PATENT OFFICE
CERTIFICATE OF CORRECTION

Patent No. 3,645,996   Dated February 29, 1972

Inventor(s) George Lee Southard   PAGE - 2

It is certified that error appears in the above-identified patent and that said Letters Patent are hereby corrected as shown below:

continued

In columns 9 and 10, column 3 of the table, line 12, "10.7 (C,2 EtOH)" should read -- -10.7 (C,2 EtOH)--.

In column 12, line 55, ".060, mM." should read --.060 mM.--.

In column 14, line 13, "R" should read --H--.

In column 14, line 22, "$R^2$ is a hydrogen" should read --$R^2$ is hydrogen--.

Signed and sealed this 18th day of July 1972.

(SEAL)
Attest:

EDWARD M. FLETCHER, JR.   ROBERT GOTTSCHALK
Attesting Officer   Commissioner of Patents